Figure 6:
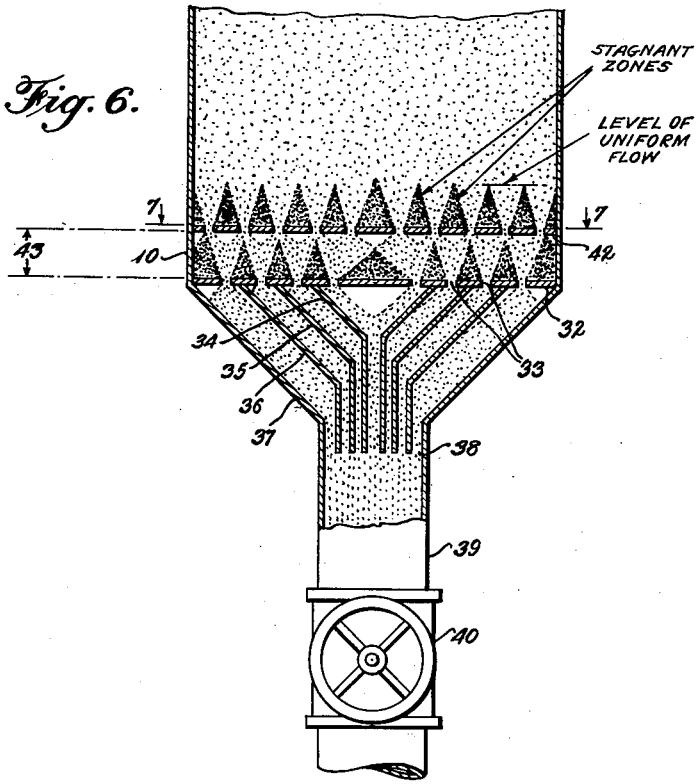

Jan. 29, 1946.   L. P. EVANS ET AL   2,393,893
METHOD AND APPARATUS FOR HYDROCARBON CONVERSION
Filed Jan. 28, 1943   2 Sheets-Sheet 1
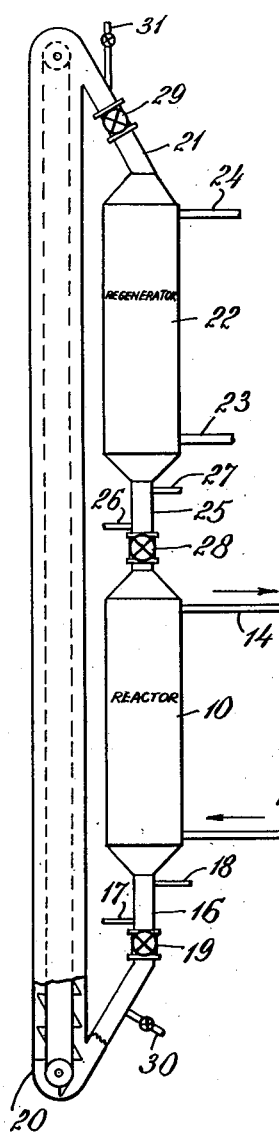
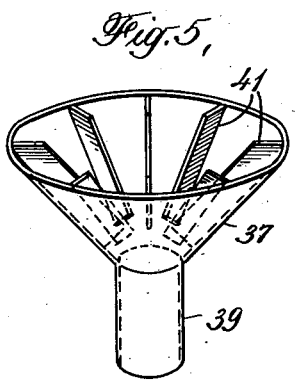
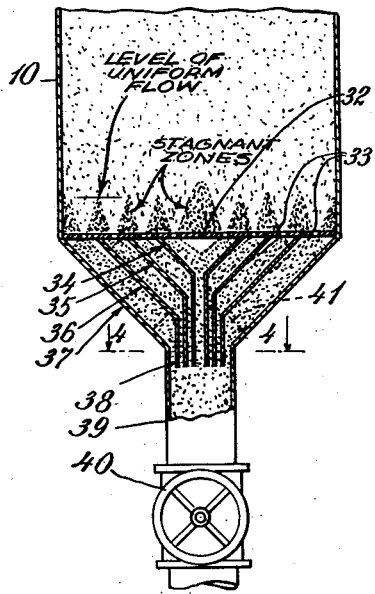
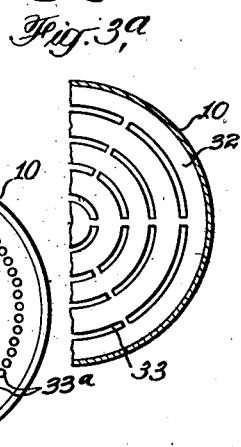
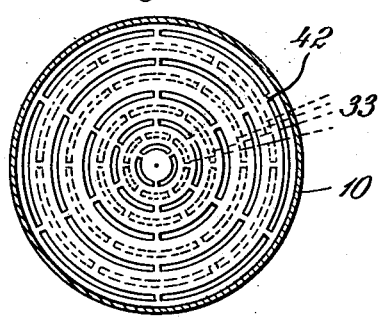
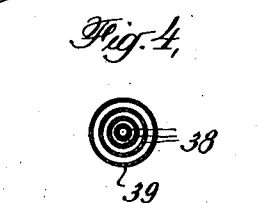
Louis P. Evans
Frederick E. Ray
INVENTORS
BY
ATTORNEY Jan. 29, 1946. L. P. EVANS ET AL 2,393,893
METHOD AND APPARATUS FOR HYDROCARBON CONVERSION
Filed Jan. 28, 1943 2 Sheets-Sheet 2

Inventors
LOUIS P. EVANS
FREDERICK E. RAY
By Myron J. Burkhard
Attorney

Patented Jan. 29, 1946

2,393,893

UNITED STATES PATENT OFFICE 2,393,893

METHOD AND APPARATUS FOR HYDROCARBON CONVERSION

Louis P. Evans, Woodbury, and Frederick E. Ray, Mantua, N. J., assignors to Socony-Vacuum Oil Company, Incorporated, a corporation of New York Application January 28, 1943, Serial No. 473,860

7 Claims. (Cl. 196—52)

This invention has to do with methods and apparatus for a conversion of hydrocarbon materials and is particularly concerned with processes such as those wherein a hydrocarbon to be converted is contacted in vapor form with a solid contact mass material capable of effecting or of influencing the desired conversion.

As is well known at this time, hydrocarbon materials may be cracked by being passed at appropriate temperatures in contact with a particle form solid contact mass of catalytic material such as a clay, either natural or synthetic, various associations of alumina and silica either natural or synthetic, alumina, silica or any of a number of similar materials possessing adsorbent properties. Other reactions such as hydrogenation, dehydrogenation, alkylation, isomerization, and various other reactions may be similarly carried out, and in many of these cases the solid adsorbent material will contain or act as a carrier for an added material such as a metallic oxide capable of effecting the desired reaction. Typical of all of these reactions is the reaction of cracking a high boiling point hydrocarbon material to material of the nature of gasoline. While the cracking conversion of hydrocarbons will be utilized herein in describing the process, it is to be understood that the invention is not limited thereto.

Many operations of this general class have been carried out in equipment wherein the solid contact material is deposited as a fixed bed, alternately subjected to reaction and to regeneration. More recently processes have been proposed wherein a particle form solid contact mass material catalytic in nature to the desired reaction, as described above, is moved in the form of a flowing stream through a reaction zone wherein the desired reaction is accomplished and then through a regeneration zone wherein residual products of the reaction which have been deposited upon the contact mass material, usually in the form of a combustible carbonaceous substance, broadly designated by the term coke, are removed, usually by combustion, to regenerate the contact mass material, after which the contact mass material is returned to the reaction zone. This invention is specifically directed to process and apparatus for the conduct of such processes wherein flowing particle form solid contact mass material is used.

This invention has for its principal object the provision of method and apparatus wherein a complete and uniform utilization of all the portions of the flowing stream of contact mass material may be attained in both the reaction zone and the regeneration zone.

It has for a major object the provision of withdrawal means to be utilized in such zones whereby uniform withdrawal across the entire area of the flowing stream of contact mass material may be effected to provide uniform passage of such material through all portions of the flowing stream.

The successful operation of processes involving continuous flow of particle form solid material through reaction vessels as in the cracking and regeneration steps of the continuous conversion process outlined above, requires that the flowing of the particle form solid material be uniform throughout the reaction zones of these vessels. When granular material is discharged from the base of a vessel through an outlet of relatively small size as compared with the vessel, the velocity of flow will vary widely across a horizontal cross-section of the vessel and will be greatest directly above the outlet. This difference in velocity decreases at higher levels in the vessel, but equal velocity and even flow is never obtained in a large vessel if its cross-sectional area is much greater than that of the outlet. Previous methods have involved the use of grates or multiple ports individually regulated in an attempt to achieve even flow of particle form material in large vessels. Grates present mechanical difficulties and are particularly undesirable on pressure vessels as they do not in themselves provide means whereby escape of reaction vapors from the vessel with solid material may be avoided and by their nature render the provision of such means a difficult and complicated problem. The individual and concurrent control of multiple ports is too complicated for practical manual control and automatic regulators prove expensive and troublesome under high temperature operating conditions.

This invention avoids these difficulties by providing a simple and efficient method whereby the combined problems of uniform flow, uniform discharge and prevention of reactant escape are accomplished through the application of relatively simple principles of operation and items of equipment.

The invention may be understood by reference to the drawings attached to this specification. In these drawings Figure 1 is a highly diagrammatic showing of the entire setup used for accomplishing the conversion. Figure 2 is a vertical cross-section of one form of the apparatus. Figure 3a is a view in horizontal section showing one form of bottom closure plate for the chamber of Figure 2.

Figure 8:
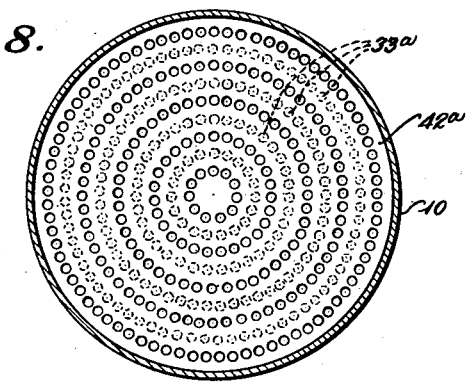

Figure 3b is a view in horizontal section showing another form of bottom closure plate for alternative use in the chamber of Figure 2. Figure 4 is a view in section taken along line 4—4 of Figure 2. Figure 5 is a perspective view of a portion of the apparatus of Figure 2. Figure 6 is a vertical section of a modified form of reaction chamber constructed according to this invention. Figure 7 is a view in horizontal section taken on the line 7—7 of Figure 6, and Figure 8 is a similar view illustrating an alternative form of baffle and bottom closure plate.

Turning now to Figure 1. This figure shows in highly diagrammatic form a setup of apparatus in which the invention may be practiced. This apparatus consists of a reaction chamber 10 through which there is moved, as a moving column, a flowing stream of particle form solid contact mass material. Hydrocarbons to be reacted, supplied to the system through pipe 11 are subjected to the charging stock preparation step indicated at 12, and from 12 flow through pipe 13 into reactor 10. The charging stock preparation step will in general consist in the main of heating the hydrocarbon charging stock to provide it in vapor form and at reaction temperature for entry to the reaction zone. The heating equipment used may be any of the usual forms of apparatus suitable for this purpose and will usually preferably include a pipe still form of heater. The stock preparation step, it is also understood, may contain, if necessary, provision for separating from the material flowing through pipe 11 any portion which is not suitable for charge to reactor 10. For example, if a crude oil were charged through 11 and it was desired to pass only gas oil through pipe 13, the stock preparation step would include appropriate fractionating equipment, evaporators, vapor heaters, if necessary, and similar equipment capable of segregating from the charge only that desired portion to be converted and bringing it to the proper temperature for reaction while rejecting other portions of the original charge from the system. Reaction products from reactor 10 will be withdrawn through pipe 14 and passed to appropriate equipment for segregating and recovering products of reaction as indicated at 15. This equipment will normally be comprised of the usual setup of fractionators, gas separators, stabilizers, gas recovery systems and the like, as indicated by the necessities of the conversion in hand and will normally include provision for returning unconverted material or even other reaction products to the reactor for retreatment with or without prior passage through a stock preparation step.

It is understood also that any provisions for heat exchange, recovery of waste heat, and the like may be used where found desirable.

Particle form solid contact mass flowing from reactor 10 and contaminated by the reaction deposit therein, is preferably passed through a purge section 16, wherein by means of a purge medium introduced at 17 and removed at 18, it may be freed of reactants. Passing through a valve 19, or any similar device, capable of controlling the rate of passage of solid material, which device also, if desired, may be so designed as to assist in the proper isolation of the reaction zone from other portions of the system, the solid material passes into elevator 20. It is therein hoisted and discharged at 21 into the top of regenerator 22, to pass therethrough as a moving column. The regeneration is usually a combustion and to effect it, regeneration medium may be introduced at 23 and withdrawn at 24. Below regenerator 22, there is another purge section 25, purge medium being supplied at 26 and withdrawn at 27, in which regeneration medium may be removed to substantially prevent its presence in reaction chamber 10. Between this purge chamber 25 and reaction chamber 10, there may be provided a valve or other device 28 for the purpose of controlling solid flow, which also, if desired, may be used to assist in the isolation of the reactor or to permit of carrying a pressure in the reactor different from that in other portions of the system. Similarly, if desired, a valve or other device 29 may be provided for complete control of similar functions within the regenerator. If necessary, catalyst may be withdrawn from the system as, for example, at 30, or may be added, as, for example at 31, and it is also to be understood that proper provision, if desirable, may be made for the removal of fines from the catalyst circulation system, for holding the external catalyst circulation system under pressure or vacuum or under a blanketing inert gas, and similar provisions.

The reaction carried out in reactor 10 in Figure 1 and the regeneration carried out in regenerator 22 are alike in that they comprise a contacting of a moving particle form solid with a fluid gasiform reactant. As pointed out before, it is advisable and even necessary that uniform contact of reactant and solid be secured and to this end at the bottom of both the regenerator and the reactor, there have been provided structures as discussed in the following figures.

In Figure 2 there is shown a vertical section at the bottom of reactor 10, somewhat in diagrammatic form, explaining the provisions which are made to secure uniform flow throughout all portions of the cross-sectional area of that reactor. Since, as explained above, similar provisions are made for similar reasons in the regenerator, it is to be understood that in this description where the term "reactor" is used, that the restriction thereto is merely for purpose of simplification and that the same construction preferably is used in both regenerator 22 of Figure 1 and reactor 10 of Figure 1.

In Figure 2, we find reactor shell 10 whose bottom closure plate 32 is provided with orifices 33, which may conveniently take the form of concentrically disposed slots; see Figure 3a. Each orifice 33 leads into one of a series of annular funnel shaped chambers disposed concentrically below plate 32 and defined as is clear from the drawings, by certain cones 34, 35, 36 and 37. Each cone terminates in a circular pipe to form a series of concentrically disposed annular passages terminating at level 38 within a single outlet pipe 39, upon which pipe there may be mounted, if desired, any valve or any other type of control device 40 useful for any of the purposes indicated for valves 19 and 28 in Figure 1. The construction between bottom plate 32 and level 38 is essentially that of a series of nested funnels providing a series of annular passages each of which establishes communication between a slot 33 and the interior of pipe 39, all terminating at the same level 38, each annular passage so proportioned as to have a flow capacity at least equal to that slot 33 which feeds it, the relative proportions of these passages at level 38 being in the proportions of the reactor area drained by each passage. In this fashion it has been found possible to effect a substantially uniform flow of solid downwardly throughout the whole of the cross-sectional area of reactor 10 which uniformity of flow is not distorted by any control of rate of flow effected by control device 40.

Certain modifications may be made in the construction of bottom closure plate 32 as indicated in Figure 3b. In this case the orifices 33a are arranged in the form of concentric rings of drilled or punched holes which are an alternative and effective equivalent of slots 33.

Figure 4 is a horizontal section taken in pipe 39 just above level 38 showing the concentric arrangement of the annular ducts at this point.

To secure a proper rigidity and maintenance of position of the various funnel-like members between plate 32 and level 38, it is found quite convenient to construct each of them, except the innermost, as shown in perspective in Figure 5, wherein each funnel member as, for example 37, is provided with inwardly extended radial ribs 41 to properly support and space the funnel shaped member which is nested inside of it.

In case this principle of operation and construction is applied to a reactor 10 of substantially great cross-sectional area, it will become necessary to provide for a further subdivision of the individual streams of solid material flowing from reactor 10. In such a case, there is installed an auxiliary baffle such as 42 in Figure 6, spaced above bottom plate 32. This auxiliary baffle will be concentrically slotted, as shown in Figure 7, or provided with concentric rings of holes, as shown in Figure 8, as is plate 32, except that there will be a larger number of individual slots or rings of holes in the upper baffle, these being so arranged as to effect a further subdivision than provided by the orifices 33 in plate 32. This is most effectively shown in Figures 7 and 8 which are respectively views in section showing in plan baffles 42 and 42a superimposed upon plate 32, showing how each single concentric slot 33 or annular row of holes 33a in plate in 32 is served by two slots or annular rows of holes in baffle 42 or baffle 42a as the case may be. This auxiliary baffle should be located a sufficient distance above plate 32, as indicated by the dimension 43 in Figure 6, so that the angle of flow from any slot in baffle 42 to its corresponding slot in plate 32 should not be less than about 45° with the horizontal. The same dimension is required in the use of the arrangement of Figure 8.

It will be understood that the principle herein employed is peculiarly adapted to a circular reaction vessel and comprises the removal of solid material in a plurality of separate streams from points symmetrically, concentrically and annularly disposed in the area of that reactor, followed by the combining of these streams into a single discharge stream under conditions capable of compelling equalized flow from all portions of the reactor so that rate of flow control may be exercised upon a single discharge stream without distorting flow conditions within the reactor.

We claim:

1. A method for effecting the conversion of a fluid reactant in the presence of a particle-form solid contact mass material flowing as a downwardly moving bed through a cylindrical reaction zone to a cylindrical discharge stream of lesser diameter which comprises, introducing reactants into said reaction zone, withdrawing products of reaction from said reaction zone, adding mass material to said reaction zone, flowing the material from the bottom of said reaction zone as a subdivided moving bed uniformly distributed over the cross-sectional area of the bottom of the reaction zone in the form of a plurality of concentric annuluses, said annuluses being interrupted at intervals along their peripheries and having a cumulative cross-sectional area materially less than that of the reaction zone, causing said subdivisions to gradually converge while maintaining their continuity, merging said concentric subdivisions at a common level into a cylindrical downwardly moving bed constituting a discharge stream in such a manner that the areas of cross-section of said subdivisions at said common level of merger are in the same proportion as their areas of cross-section at the bottom of the reaction zone and throttling the flow in said discharge stream at a level substantially below said common level of merger so as to effect uniform resistance to flow from said concentric subdivisions at said common level of merger per unit of cross-sectional area.

2. A method for effecting the conversion of a fluid reactant in the presence of a particle-form solid contact mass material flowing as a downwardly moving bed through a cylindrical reaction zone to a cylindrical discharge stream of lesser diameter which comprises, introducing reactants into said reaction zone, withdrawing products of reaction from said reaction zone, adding mass material to said reaction zone, flowing the material from the bottom of said reaction zone as a subdivided moving bed uniformly distributed over the cross-sectional area of the bottom of the reaction zone in the form of a plurality of concentric annuluses, said annuluses being interrupted at intervals along their peripheries and having a cumulative cross-sectional area materially less than that of the reaction zone, partially and proportionately combining said annular subdivisions into a second group of concentrically disposed annuluses at a substantially common level, said second group being less in number than the first, causing said second group of subdivisions to converge while maintaining their continuity, merging said second group of concentric subdivisions at a common level into a cylindrical, continuous downwardly moving discharge stream in such a manner that the areas of cross-section of said subdivisions at said common level of merger are in the same proportions as their areas of cross-section at the said level of partial combination and throttling the flow in said discharge stream at a level substantially below said common level of merger so as to effect uniform resistance to flow from said concentric subdivisions at said common level of merger per unit of cross-sectional area.

3. A method for converting hydrocarbons in the presence of a uniformly, downwardly moving particle-form solid contact mass material with substantially equal exposure of all portions of the contact mass comprising: maintaining a downwardly moving column of said solid material of substantially circular cross-section, replenishing said column at the top thereof, introducing hydrocarbons thereto at conversion conditions of temperature and pressure, removing products of conversion therefrom, removing spent solid material from the bottom thereof at a common level in a plurality of annularly and concentrically disposed continuous streams, causing said streams to converge while maintaining their continuity and concentricity, merging said streams at a common level to form a single continuous, composite discharge stream in such a manner that the areas of cross-section of said streams at said common level of merger are in the same proportion as their areas of cross-section at said common level of removal from the bottom of said column and throttling the flow in said single discharge stream at a level substantially below said common level of merger so as to effect uniform resistance to flow from said converging streams at said common level of merger per unit of cross-sectional area.

4. Apparatus for effecting the conversion of a fluid reactant in the presence of a particle-form solid contact mass material flowing as a downwardly moving bed which apparatus comprises: a cylindrical reaction chamber, means for introducing reactants into said reaction chamber, means for withdrawing reaction products therefrom, means for introducing said solid material into said reaction chamber, a plate constituting the bottom of said reaction chamber, said plate having a plurality of concentric annular apertures uniformly arranged across its horizontal cross-sectional area, said apertures being interrupted at intervals around their circumferences, a cylindrical discharge conduit below said reaction chamber, said discharge conduit being of substantially smaller horizontal cross-section than said reaction chamber, a connecting member between the lower end of said reaction chamber and said discharge conduit, means within said connecting member defining a plurality of concentric converging passages one for each of said concentric annular apertures extending from said bottom plate to a common level within said discharge conduit, said passages being so defined that the areas of their discharge ends at said common level within said discharge conduit are in the same proportion as the areas of the apertures served thereby, means to throttle the flow of solid material from said discharge conduit so as to maintain the rate of solid flow at said common level therein substantially uniform across the entire cross-sectional area of said discharge conduit.

5. Apparatus for effecting the conversion of a fluid reactant in the presence of a particle form solid contact mass material flowing as a downwardly moving bed which method comprises a cylindrical reaction shell closed on its upper end, means for introducing reactants thereinto, means for withdrawing reaction products therefrom, means for introducing particle form solid contact mass material thereinto, a plate near the bottom of said reaction chamber, said plate having a plurality of concentric annular apertures uniformly arranged across its horizontal cross-sectional area, said apertures being interrupted at intervals along their peripheries, a second plate vertically spaced below said first plate, said second plate having a smaller number of similar concentric annular apertures therein arranged in horizontally staggered relation to the apertures in said first plate, a cylindrical discharge conduit below said reaction shell of considerably less cross-sectional area than said shell, a tapering connecting member between said reaction shell and said discharge conduit, means within said connecting member defining a plurality of concentric converging passages, one for each of said concentric annular apertures in said second plate, extending from said second plate to a common level within said discharge conduit, said passage defining means being so arranged that the horizontal cross-sectional areas of said passages at said common level within said discharge conduit are in the same proportion as the areas of the annular apertures from which they draw, and throttling means on said discharge conduit adapted to maintain uniform solid flow across the cross-section at said common level.

6. Apparatus for converting hydrocarbons in the presence of a moving particle-form solid contact mass comprising means to define an elongated reaction chamber of substantially circular cross-section, means to feed solid to the top thereof, means to introduce hydrocarbon reactants thereto, means to remove reaction products therefrom, a bottom closure means for said reactor, a plurality of concentrically disposed annularly located rows of orifices in said closure, a baffle spaced above said closure and in said baffle other annularly, concentrically, arranged rows of orifices disposed horizontally symmetrically between said rows of orifices in said closure, below said closure concentrically disposed individual passages for each of said rows of orifices in said bottom closure, and a single solid material discharge tube into which all of said passages discharge at a common level, said passages being so disposed that their areas of cross-section at said common level are in the same proportion as the areas of the respective rows of annular orifices in said bottom closure, and means located substantially below said common level to throttle the solid flow from said discharge tube.

7. Apparatus for converting fluid reactants in the presence of a moving particle-form solid contact mass comprising means to define an elongated reaction chamber of substantially circular cross-section, means to feed solid to the top thereof, means to introduce reactants thereto, means to remove reaction products therefrom, a bottom closure means for said reactor, a plurality of concentrically disposed uniformly spaced circular rows of orifices in said closure, below said closure a solid material discharge conduit having a uniform horizontal cross-section of substantially less area than that of said reaction chamber, means defining concentrically disposed individual passages for each of said rows of orifices extending between said closure and a common level in said discharge conduit, said passage defining means being so arranged that the horizontal cross-sectional areas of said passages at said common level in said discharge conduit are in the same proportion as the areas of concentric rows of orifices served thereby and flow throttling means on said conduit at a level substantially below said common level.

LOUIS P. EVANS.
FREDERICK E. RAY.